No. 660,672. Patented Oct. 30, 1900.
J. A. VERNON.
CHALK LINE HOLDER.
(Application filed Oct. 14, 1899.)
(No Model.)

Witnesses:
H. E. Harrison
W. H. Errson Jr.

Inventor:
Joseph A. Vernon
By O. D. Levis
Atty.

UNITED STATES PATENT OFFICE.

JOSEPH A. VERNON, OF HOMESTEAD, PENNSYLVANIA.

CHALK-LINE HOLDER.

SPECIFICATION forming part of Letters Patent No. 660,672, dated October 30, 1900.

Application filed October 14, 1899. Serial No. 733,611. (No model.)

*To all whom it may concern:*

Be it known that I, JOSEPH A. VERNON, a citizen of the United States of America, residing at Homestead, in the county of Allegheny and State of Pennsylvania, have invented certain new and useful Improvements in Chalk-Line Holders; and I do hereby declare the following to be a full, clear, and exact description thereof, reference being had to the accompanying drawings, which form a part of this specification.

My invention relates to an improved chalk-line holder; and it consists in a device by means of which the line may be reeled and at the same time receive a chalk deposit along its entire length, together with the certain details of construction and combination of parts, as will be fully described hereinafter.

Figure 1:
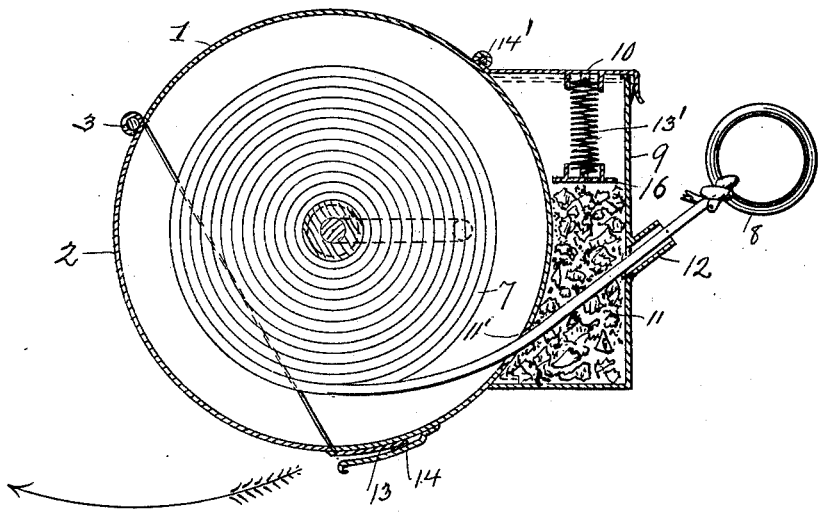
Figure 2:
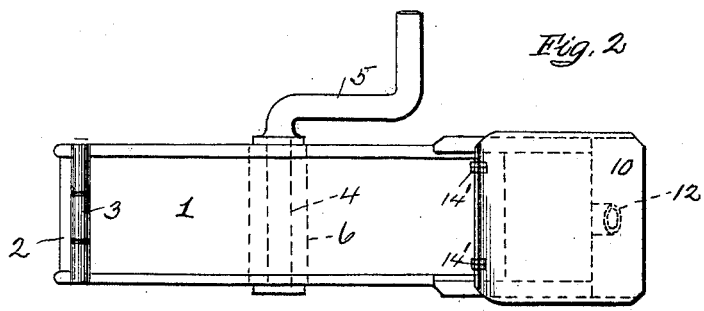

In the accompanying drawings, Figure 1 is a side sectional elevation of an improved chalk-line holder which is constructed and arranged in accordance with my invention. Fig. 2 is a plan view of the same, showing the cover of the chalk-receptacle partly open.

To construct an automatic device for chalking lines for a purpose well known in the art, I form from thin sheet metal or tin a circular box 1, having a section 2, connected by a hinge 3, to form a lid by means of which the interior of the box may be reached. This lid 2 is held secure by a catch 13, entering a socket 14. Arranged transversely within the box 1 is a reel 6, mounted upon a shaft 4, formed integral with a crank 5. Secured to the box 1, on the side opposite to the lid 2, is a chalk-receptacle 9, having a lid or cover 10, hinged, as at 14', to the box 1. This lid or cover 10 has secured to its underneath face the one end of a coil-spring 13', which carries on its other or lower end a compression or packing disk 16, adapted to rest upon the powdered or granulated chalk 11 in the receptacle and compress or pack the same firmly around the line 7, so that the latter may be thoroughly chalked as it is withdrawn from the box 1. The box 1 is provided near the base of the receptacle 9 with an opening 11', while the receptacle 9 is provided in its front wall at a point above the opening 11' with an opening 12, these openings being adapted to receive the line 7 and permit the winding upon or unwinding of the same from its reel. The free end of the line has preferably attached thereto a ring 8 or equivalent device to prevent the end of the line being drawn into the box when rewinding.

In operation the line 7 is reeled, as shown at Fig. 1 of the drawings, and a sufficient amount of granulated chalk 11 placed in the receptacle 9 to last for some time and the lid or cover 10 closed. By simply drawing upon the line 7, causing the same to pass through the chalk 11, a sufficient deposit will be distributed along the line 7.

The line may be reeled by revolving the crank 5.

Having thus described my invention, I claim—

1. In a chalk-line holder, the combination, with the box 1 having the hinged lid 2, the shaft journaled in the sides of said box and the reel mounted on said shaft within the box, of the chalk-receptacle secured to said box, a hinged lid or cover for said receptacle, and a spring-actuated compression-disk carried by said lid or cover and adapted to compress the chalk within the receptacle when the lid or cover is closed, as and for the purpose described.

2. A chalk-line holder comprising a box provided with a hinged section forming a lid, a shaft journaled in the sides of said box with a crank secured on its one end, a reel mounted on said shaft within the box to receive the chalk-line, a chalk-receptacle connected to said box opposite to the hinged section thereof, said receptacle and box provided with openings to receive the chalk-line, a hinged lid or cover for said receptacle, and a spring-actuated compression-disk carried by said lid or cover, as and for the purpose specified.

3. In combination, a box having a reel mounted therein to receive the chalk-line, a chalk-receptacle secured to said box, said box and receptacle being provided with openings to receive the chalk-line, a lid or cover for said receptacle, and a spring-actuated compression-disk carried by said lid or cover, as and for the purpose specified.

4. In combination, the box 1 having the hinged section 2 forming a lid, a chalk-receptacle secured to the box on the opposite side to the hinged section 2, a reel mounted within the box, said box being provided with an opening near the bottom of the chalk-receptacle and the chalk-receptacle having an opening in its outer wall above the opening in the box, and a hinged lid or cover for said receptacle, substantially as shown and described.

In testimony whereof I have hereunto affixed my signature in the presence of two subscribing witnesses.

JOSEPH A. VERNON.

Witnesses:
JOHN GROETZINGER,
HUGH J. O'DONNELL.